Nov. 9, 1937.    C. H. GREENEWALT    2,098,289
PROCESS FOR THE CATALYTIC SYNTHESIS OF AMINES
Filed July 13, 1934
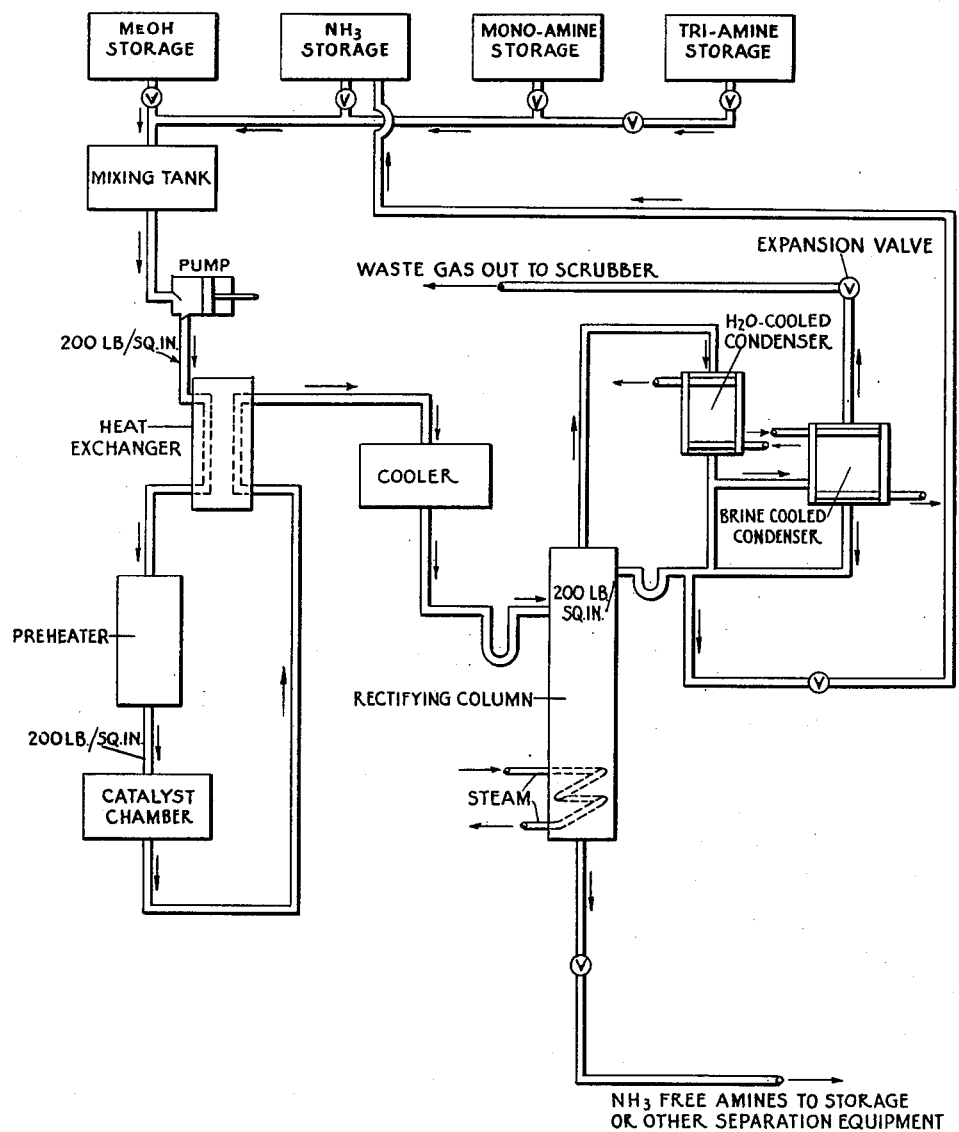
INVENTOR.
Crawford H. Greenewalt
BY
George W. Walker
ATTORNEY.

Patented Nov. 9, 1937

2,098,289

UNITED STATES PATENT OFFICE 2,098,289

PROCESS FOR THE CATALYTIC SYNTHESIS OF AMINES

Crawford H. Greenewalt, Wilmington, Del., assignor to E. I. du Pont de Nemours & Company, Wilmington, Del., a corporation of Delaware Application July 13, 1934, Serial No. 734,928
In Great Britain October 13, 1932

14 Claims. (Cl. 260—127)

This invention relates to catalytic processes for the synthesis of alkyl amines from alcohols and ammonia and more particularly to the production of methyl amines from methyl alcohol and ammonia.

This case is a continuation in part of the applicant's copending applications, Serial No. 558,106, filed August 19, 1931 and Serial No. 675,092 filed June 9, 1933.

The catalytic synthesis of amines from alcohols and ammonia has been described in the literature. The reaction is ordinarily carried out at atmospheric pressure in the vapor phase in the presence of various dehydrating oxides, such as thoria, alumina, zirconia, silica, and tungsten oxides. The products which are obtained in the vapor state are either absorbed in a suitable solvent or compressed, cooled and condensed. The resulting solution or condensed mixture is then separated, usually by distillation.

One of the objects of this invention is to provide an improved process for the catalytic synthesis of amines from alcohol and ammonia whereby the products are obtained directly in a suitable condition for separation. Another object is the combination of synthesis and separation steps with recirculation of the undesired products over the catalyst in such a manner that a considerable saving in equipment and power is effected. Other objects will appear hereinafter.

These objects are accomplished by the following invention which comprises a cyclic process whch includes conducting the vapors of alcohol and ammonia, mixed in suitable proportions, over an active catalyst at elevated pressures, condensing the products to a liquid state, separating by distillation, and recirculating over the catalyst the undesired products together with additional amounts of alcohol and ammonia.

Figure 1 is a flow sheet showing a preferred form of the process described by the applicant.

In the process disclosed by the flow sheet, methyl alcohol, ammonia, monomethylamine and trimethylamine are drawn off in their various storage tanks and mixed in a mixing tank. The liquid mixture is pumped to a pressure of about 200 lbs. per sq. in., where it is heated and preheated so as to vaporize the various constituents. The vapor is then passed through the catalytic chamber where the ammonia and methanol react to form dimethylamine. The products of reaction in vapor form are passed from the catalytic chamber through a heat exchanger in heat exchange relationship with the incoming liquid reactants from the pump. The cooled reaction products are further cooled and then are passed into a rectifying column where the ammonia is separated as a liquid fraction at the top of the column and the ammonia-free amines are separated as a liquid fraction at the bottom of the column. The waste gas that comes off as a gaseous fraction at the top of the column is cooled first by means of a water-cooled condenser and then by means of a brine-cooled condenser, where any ammonia contained therein is condensed. The pressure on the waste gas is then released and the gas is passed out of the system. The ammonia from the water-cooled and brine-cooled condensers and from the top of the rectifying column is returned to the ammonia storage tanks.

The following examples describe preferred forms of the invention. These examples are not to be construed as limiting the scope of the invention but are to be taken as illustrative only.

Example I

A liquid mixture containing 37.3% ammonia and 62.7% methyl alcohol was charged into a long cylindrical steel vessel provided with sight glasses and connected at the base to the suction side of a small proportioning pump. The ammoniacal mixture in the steel cylinder was pumped directly into a heated reaction tube containing 100 cc. of a catalyst comprising alumina supported on silica gel. The catalyst tube was contained in an electric furnace which served to maintain the catalyst temperature at 440° C. and to supply heat to a vaporizing chamber located prior to the catalyst bed. The liquid products were condensed, passed into a separator, and the pressure on the reaction system was maintained at 230 lbs. per sq. in. gauge by venting the small volume of fixed gases formed during the passage over the catalyst. Nearly complete recovery of the materials charged was obtained in the form of a condensed liquid product. This product was analyzed by well known methods. The following table gives comparative analyses of the charging stock and of the product.

| Constituent | Reactant | Product |
|---|---|---|
| Ammonia | 37.3 | 17.4 |
| Monomethyl amine | 0 | 16.9 |
| Dimethyl amine | 0 | 9.7 |
| Trimethyl amine | 0 | 16.9 |
| Methanol | 62.7 | 3.6 |
| Water | 0 | 35.5 |

The conversion of methyl alcohol to amines was 95%. In the event that all three of these amines are not desired, the ammonia, methanol and the undesired amine or amines are separated from the desired product and recirculated over the catalysts combined with the required additional amounts of methanol and ammonia.

Example II

For the purpose of preparing pure dimethylamine a liquid mixture containing 28.4% ammonia, 12.0% of monomethylamine, 39.7% trimethylamine, and 19.9% of methyl alcohol was pumped from a suitable pressure vessel through a coil of heated, pressure resisting tubing which served as a vaporizer. From the vaporizer, the mixture now at 380–390° C. and completely in the vapor state, was passed over 1 liter of a suitable catalyst containing principally alumina. The pressure vessel containing the catalyst was provided with an external heating element and the temperature in the center of the catalyst bed was maintained at 400–410° C. The reaction pressure was controlled at 230 lbs. per sq. in. gauge and the injection rate at approximately 2.0 liters per hour. The reaction products were cooled and led into a pressure separator. The system pressure was held at a constant value by withdrawal of the small volume of fixed gas resulting from alcohol decomposition from the top of the above separator. The alcohol thus decomposed was but a small fraction of the total charged, i. e., about 5%. The liquid products which accumulated in the separator under reaction pressure were transferred to a batch still and fractionated. An ammonia fraction, a fraction containing principally monomethylamine, and a third cut free from monomethylamine but containing a mixture of di- and tri- amines were obtained. These distilled fractions were subjected to chemical analysis and the composition of the original reaction product determined. A small amount of the reaction mixture was neutralized with sulphuric acid and the resulting salt solution distilled. No unconverted methyl alcohol was found.

The following table gives a comparison of the compositions of the charging stock and of the products as determined by distillation and analytical data. Since the losses on the synthesis and distillation steps were negligible, these figures may be compared directly.

| Constituent | Charge wt. % | Product wt. % |
| --- | --- | --- |
| Ammonia | 28.4 | 25.7 |
| Monomethylamine | 12.0 | 10.6 |
| Dimethylamine | 0 | 18.0 |
| Trimethylamine | 39.7 | 38.2 |
| Methanol | 19.9 | 0 |

Where the process is directed to the preparation of pure dimethylamine, the dimethylamine is separated from the product and the remaining constituents of the product are combined with the proper amounts of ammonia and methanol and recirculated over the catalyst. The presence of the undesired amines in the reaction chamber causes suppression of their formation with the final result that dimethylamine is substantially the only product. When it is desired to control the process to obtain trimethylamine as the only product or as the principal product, a high ratio of methanol and ammonia is maintained in the reaction mixture and the trimethylamine is separated from the product. The monomethylamine and dimethylamine which are formed are recirculated over the catalyst together with the proper amount of methanol and ammonia.

Example III

The amine synthesis was carried out in the manner outlined in Example II, but the cooled reaction product, instead of passing to a high pressure separator, is led directly into a small rectifying column operated under the same pressure as the synthesis system. The liquid in the calandria at the base of this column is boiled with steam and reflux is supplied at the top by cooling with water. Liquid ammonia is withdrawn from the top of the column, conveyed to suitable storage facilities, and reused in the amine synthesis. The liquid in the "boiler" or calandria is cooled and discharged to storage vessels or directly to equipment suitable for the isolation of the individual amines. The vent gas from the top of the water cooled condenser is passed to an ammonia cooled auxiliary condenser where its temperature is reduced to about −10° C. This low temperature suffices to liquefy most of the ammonia vapor escaping the first condenser. The condensed ammonia is returned to the column as reflux. The equipment for the catalytic synthesis and for the exhaustion of unconverted ammonia from the reaction product is operated as a single unit and the pressure on the entire system, i. e., synthesis and ammonia exhaustion column, is controlled by regulation of the volume of cooling water to the ammonia stripping column condenser.

Example IV

Methyl alcohol and liquid, anhydrous ammonia were pumped individually to 2000 lbs. per sq. in., passed through a coiled preheater where complete vaporization of both constituents was effected, and the vaporized mixture forced over 220 cc. of an aluminum phosphate catalyst maintained at 340° C. The rates of injection were 176 g. and 112 g. per hour for methyl alcohol and for ammonia respectively. The products were cooled and expanded to 1 atmosphere into a scrubbing column. The expanded products passed up through the scrubbing column counter-current to a dilute acid solution which reacted with the basic constituents and carried the resulting salts to a receiver at the base of the column. The fixed gases, such as carbon monoxide and hydrogen, were vented from the top of the scrubbing column and metered. The salt solution was analyzed by methods well known to those familiar with the art, and it was found that 71.5% of the methanol charged was converted to methylamines. Of the methyl alcohol fed to the catalyst chamber, 20.0% was recovered as monomethylamine, 26.2% as dimethylamine, and 27.7% as trimethylamine.

Reaction pressures of 230 and 2000 lbs. per sq. in. gauge have been mentioned in the above examples. There is, however, little advantage in operating at pressures higher than 400 lbs. per sq. in. If it is intended to collect the entire reaction product in a separate storage prior to separation of the mixture into its constituents, a pressure range of 100–400 lbs. per sq. in. is satisfactory. If, however, it is desired to remove unconverted ammonia in a stripping column which is operated in conjunction with the catalytic synthesis, it is preferred to employ a pressure within the range which permits the condensation of ammonia with ordinary cooling water. This pressure, of course, will vary with seasonal fluctuations in cooling water temperature but will generally be within the range 175–300 lbs. per sq. in. gauge.

The gases passing into the catalyst may be preheated to a temperature somewhat lower than that of the reaction chamber and the catalyst should be heated to between 300° and 500° C. in order to have favorable reaction conditions. The temperature, however, will vary with the type of catalyst used and the rate of flow of the gases over the catalyst. It is within the contemplation of this invention, however, to use any temperature at which amines will be formed when the gases containing ammonia and alcohol are brought into contact with the catalyst.

My invention is applicable to the simultaneous production of all three methylamines from methyl alcohol and ammonia, and to the synthesis of any desired amine individually by separation of the desired amine from the reaction product recirculation of the other two amines as disclosed for operation at atmospheric pressure in United States Letters Patent, Serial No. 1,799,722, issued April 7, 1931 to H. R. Arnold. The concentration of reactants for the case in which all three amines are to be produced depends upon the characteristics of the products which are desired, and may be varied at will without affecting the operation of my process.

If monomethylamine is not desired as an end product but is to be recovered and recycled to prevent its further formation, it is feasible to remove both ammonia and the mono derivative as "heads" by fractionating the mixture, and thus leave the di- and tri- amines for further processing. Should the proportions of reactions contacted with the catalyst be such that the reaction product contains little or no ammonia, it is advantageous to proceed in the general manner outlined in Example III but to strip monomethylamine from the reaction mixture.

My invention is not limited to the use of a specific catalyst but can be successfully carried out with a number of active dehydrating materials. Among these may be mentioned alumina on charcoal and silica gel, basic aluminum sulphate, and aluminum phosphate.

Ammonia and methylamines are extremely volatile bases, and the best practical method of separating a mixture of the above materials is to subject it to a pressure distillation. Methylamines, when produced by synthesis at substantially atmospheric pressure, are obtained largely in the vapor state and must be compressed or refrigerated prior to fractionation under pressure. An important advantage of my invention is the elimination of a gas compression operation between the synthesis and separation steps. A material savings in power is effected, since it is much cheaper to pump the liquid reactants to the synthesis pressure than to compress and liquefy the gaseous products.

It is especially advantageous to combine the synthesis and initial distillation steps in a single operation maintained at essentially the same pressure throughout. This reduces equipment and labor costs, simplifies control problems, and permits the production of ammonia free methylamines at a uniform rate. Intermediate compression and absorption operations are avoided.

In addition to the above advantages, it has been found that the rate of catalyst productivity is materially increased by operation at elevated pressures. This decreases catalyst requirements and equipment size.

As many apparently widely different embodiments of this invention may be made without departing from the spirit and scope thereof, it is to be understood that I do not limit myself to the specific embodiments thereof except as defined in the appended patent claims.

I claim:

1. A process of making lower alkyl amines, which comprises catalytically synthesizing the amines at a pressure in excess of 100 lbs. per square inch and then directly fractionating the reaction product at substantially the same superatmospheric pressure to separate the components.

2. A process of making lower alkyl amines, which comprises passing a vapor comprising essentially ammonia and a lower alkyl alcohol in proportions sufficient to react to form amines over an amination catalyst at a temperature within the range of 300° to 500° C. and cooling the resulting vapors, while maintaining the system under a pressure in excess of 100 lbs. per square inch sufficient to liquefy the vapors in the cooling step, said pressure being substantially the same in both the catalytic step and in the cooling step.

3. A process of making lower alkyl amines, which comprises passing a vapor comprising essentially ammonia and a lower alkyl alcohol in proportions sufficient to react to form amines over an amination catalyst at a temperature within the range of 300° to 500° C. and cooling the resulting vapors, while maintaining the system under a pressure in excess of 100 lbs. per square inch sufficient to liquefy the vapors when cooled to room temperature, said pressure being substantially the same in both the catalytic step and in the cooling step.

4. A process of making lower alkyl amines, which comprises passing a vapor comprising essentially ammonia and a lower alkyl alcohol, in proportions sufficient to react to form amines over an amination catalyst at a temperature within the range of 300° to 500° C. and cooling the resulting vapors, while maintaining the system under a pressure in excess of 100 lbs. per square inch sufficient to liquefy the vapors in the cooling step, and while maintaining that pressure constant by periodically bleeding the vapor system, said pressure being substantially the same in both the catalytic step and in the cooling step.

5. A process of making methylamine, which comprises passing a vapor comprising essentially ammonia and methyl alcohol in proportions sufficient to react to form amines over an amination catalyst at a temperature within the range of 300° to 500° C. and cooling the resulting vapors, while maintaining the system under a pressure in excess of 100 lbs. per square inch sufficient to liquefy the vapor in the cooling step, said pressure being substantially the same in both the catalytic step and in the cooling step.

6. The process of claim 5, in which the pressure is maintained at 100 to 400 lbs. per square inch.

7. The process of claim 5, in which the pressure is maintained at 175 to 300 lbs. per square inch.

8. A process of making lower alkyl amines, which comprises the step of passing a vapor comprising essentially ammonia and a lower alkyl alcohol in proportions sufficient to react to form amines over an amination catalyst at a pressure of about 230 lbs. per square inch and at a temperature sufficient to cause the conversion of the said alcohol and ammonia to amines, cooling the resulting products to liquefy same and passing them directly to a rectifying column under the same pressure as the system to separate from the amines formed unreacted ammonia together with any trimethylamine that may come over as an azeotropic mixture with the unreacted ammonia.

9. A process of making amines, which comprises passing a vapor comprising essentially a lower alkyl alcohol and ammonia in proportions sufficient to react to form amines, under a pressure of 200 to 400 lbs. per square inch and at a temperature sufficient to cause the conversion of the said alcohol and ammonia to amines, over an amination catalyst, cooling the reaction product and rectifying same, while maintaining the system under the pressure initially created.

10. A process which comprises creating a pressure of between 100 and 400 lbs. on a liquid mixture containing essentially ammonia, monomethylamine, trimethylamine and methyl alcohol, heating said liquid mixture to vaporize same, preheating the vapor, passing the preheated vapor over an amination catalyst heated to between 300° and 500° C., cooling the reaction product and rectifying same, while maintaining the system under the pressure initially created.

11. A process which comprises heating a liquid comprising essentially ammonia, monomethylamine, trimethylamine and methyl alcohol, so as to vaporize same, preheating the vapors to between 380 and 390° C., passing the preheated vapors over an amination catalyst heated at 400 to 410° C., cooling the reaction products so as to liquefy any amines and ammonia present, while maintaining a pressure in the system of about 230 lbs. per square inch.

12. A process of making dimethylamine, which comprises creating a pressure on a liquid mixture consisting of approximately 28% ammonia, 12% monomethylamine, 40% trimethylamine and 20% methyl alcohol, of about 230 lbs. per square inch, heating said liquid mixture to vaporize same, preheating the vapor to about 380 to 390° C., passing the preheated vapor over an amination catalyst heated to about 400 to 410° C.; cooling the reaction products, passing the cooled products into a rectifying column and thereby separating from the amines formed the unreacted ammonia in the form of an azeotropic mixture of ammonia and trimethylamine, cooling this ammonia-trimethylamine azeotrope to condense same, while maintaining the entire system under a constant pressure of about 230 lbs. per square inch, separating the monomethylamine and trimethylamine from the amines formed and recycling these two amines together with the ammonia to help make up the initial liquid mixture.

13. In a recirculatory catalytic process of making a lower alkyl amine from ammonia and a lower aliphatic monohydric alcohol in which the formation of the undesired amine is inhibited by separating the desired amine and recirculating the undesired amine over an amination catalyst, the steps which comprise maintaining the entire system at a pressure in excess of 100 pounds per square inch, compressing the reactants to the pressure of the system and introducing same into the system at a point so that they will pass over the catalyst, and fractionally distilling at the pressure of the system the product obtained by the contact of the reactants with the catalyst to separate the desired portion of the product from the undesired.

14. Process in accordance with claim 13, characterized in that the lower aliphatic monohydric alcohol is methyl alcohol.

CRAWFORD H. GREENEWALT.